US006688260B2

United States Patent
Morrison

(10) Patent No.: US 6,688,260 B2
(45) Date of Patent: Feb. 10, 2004

(54) RETRACTABLE PET LEASH

(75) Inventor: Mark D. Morrison, New York, NY (US)

(73) Assignee: MPDI, New York, NY (US)

( * ) Notice: Subject to any disclaimer, the term of this patent is extended or adjusted under 35 U.S.C. 154(b) by 0 days.

(21) Appl. No.: 10/144,152

(22) Filed: May 13, 2002

(65) Prior Publication Data

US 2003/0183176 A1 Oct. 2, 2003

Related U.S. Application Data

(60) Provisional application No. 60/368,907, filed on Apr. 1, 2002.

(51) Int. Cl.[7] .............................................. A01K 27/00
(52) U.S. Cl. ..................................................... 119/796
(58) Field of Search ................................ 119/769, 770, 119/798; D30/153, 154, 152, 151, 144

(56) References Cited

U.S. PATENT DOCUMENTS

| | | | | |
|---|---|---|---|---|
| 3,088,438 A | * | 5/1963 | Oliphant ..................... | 119/770 |
| 3,477,410 A | * | 11/1969 | Lettieri ........................ | 119/794 |
| 4,165,713 A | * | 8/1979 | Brawner et al. ............ | 119/794 |
| 4,501,230 A | * | 2/1985 | Talo ............................ | 119/796 |
| D300,474 S | * | 3/1989 | Caulder et al. ........ | D29/101.1 |
| 4,932,362 A | * | 6/1990 | Birchmire et al. .......... | 119/772 |
| 4,977,860 A | * | 12/1990 | Harwell ....................... | 119/794 |
| 5,080,045 A | | 1/1992 | Reese et al. ................ | 119/109 |
| 5,638,772 A | * | 6/1997 | Kaufmann et al. .......... | 119/770 |
| 5,649,504 A | * | 7/1997 | Culp ........................... | 119/795 |
| 5,733,231 A | * | 3/1998 | Corn et al. ................. | 482/120 |
| 5,887,550 A | * | 3/1999 | Levine et al. ............... | 119/796 |
| 5,890,456 A | * | 4/1999 | Tancrede .................... | 119/794 |
| 5,950,569 A | * | 9/1999 | Perrulli ....................... | 119/770 |
| 6,095,093 A | * | 8/2000 | Kisko et al. ................ | 119/770 |
| D430,957 S | * | 9/2000 | Boucugnani et al. ...... | D29/100 |
| 6,226,886 B1 | * | 5/2001 | Lamond et al. ............... | 33/769 |
| 6,289,849 B1 | | 9/2001 | Macedo et al. ............. | 119/796 |
| 6,308,662 B1 | | 10/2001 | Furman ....................... | 119/776 |
| 6,314,917 B1 | | 11/2001 | Ryan .......................... | 119/796 |
| 6,368,262 B1 | * | 4/2002 | Willoughby et al. ........ | 482/148 |

OTHER PUBLICATIONS

"New England Serum Company" Early Spring Catalog 2001, p. 111.

* cited by examiner

Primary Examiner—Charles T. Jordan
Assistant Examiner—Kimberly S. Smith
(74) Attorney, Agent, or Firm—Hayes Soloway PC

(57) ABSTRACT

A retractable pet leash is disclosed that can alternatively be held in a user's hand or secured to a belt worn around the user's waist. The leash is retractable inside an enclosure having a concave surface designed to conform generally to the shape of a user's hip or waist. The retractor retracts a first length of leash that has a first connector coupled to its distal end. The first connector can be coupled to a second connector that is coupled to a handle portion of a second length of leash. The connectors allow the user to disconnect the second length of leash from the retractor.

2 Claims, 1 Drawing Sheet

RETRACTABLE PET LEASH

This application claims the benefit of copending U.S. provisional patent application serial No. 60/368,907 filed Apr. 1, 2002, the teachings of which are incorporated herein by reference.

FIELD OF THE INVENTION

The present invention relates to pet leashes and more particularly to a retractable and detachable leash capable of being held in the hand or mounted about a user's waist.

BACKGROUND OF THE INVENTION

Retractable pet leashes are known in the art. These leashes provide for variable attachment, in distance, between a pet and the owner. These devices typically have a wind-up spool disposed in a housing with a thumb-actuated brake for controlling the amount of leash to be dispensed. Improvements to leashes are desirable; and one object of the invention is to provide a new and improved retractable leash. A drawback to known retractable dog leashes is the retractor must be held in one hand. This can make running or carrying items such as groceries difficult with your pet in tow. Another problem with existing retractor leashes is the leash cannot be separated from the retractor. This can present problems when a user wants to tie his pet outside of a store without leaving the costly retractor with the pet or when the user needs to get away from the pet, for example when a dog gets into a fight with another dog.

SUMMARY OF THE INVENTION

The invention is directed to a pet leash device that can be held in a user's hand or worn about the user's waist. The device includes a retractor enclosed in an enclosure with a manually actuated brake for controlling the amount of dispensed leash. The enclosure includes a handle portion where the user may grasp the device and a loop for inserting a belt through to couple the housing to the user's waist. The enclosure may include a concave surface to allow the device to more comfortably fit about a user's waistline.

In one embodiment the invention provides a retractable pet leash having an enclosure for housing a retractor, the enclosure having a loop located generally parallel with a leash coupled to the retractor.

In another embodiment the invention provides a retractable pet leash having an enclosure for housing a retractor, a first flexible leash having a first connector located at one end, and a second flexible leash having a connector that mates with the first connector connected to a handle at one end of the second leash and a clasp for coupling to a pet's collar at the other end of the second leash.

In yet another embodiment the invention provides a retractable pet leash that has an enclosure for housing a retractor, the retractor being coupled to a first end of a first length of flexible leash. A second end of the first length of leash is coupled to a first end of a second length of leash by a releasable connector. A second end of the second length of leash having a clasp for connecting the second length of leash to a pet's collar.

In still another embodiment the invention provides a retractable pet leash that has an enclosure with a concave surface disposed to one side of the retractor.

The above and other objects, feature, and advantages of the present invention will be apparent in the following detailed description thereof when read in conjunction with the appended drawings wherein the same reference numerals denote the same or similar parts throughout the several views.

DETAILED DESCRIPTION OF THE INVENTION

Figure 1:
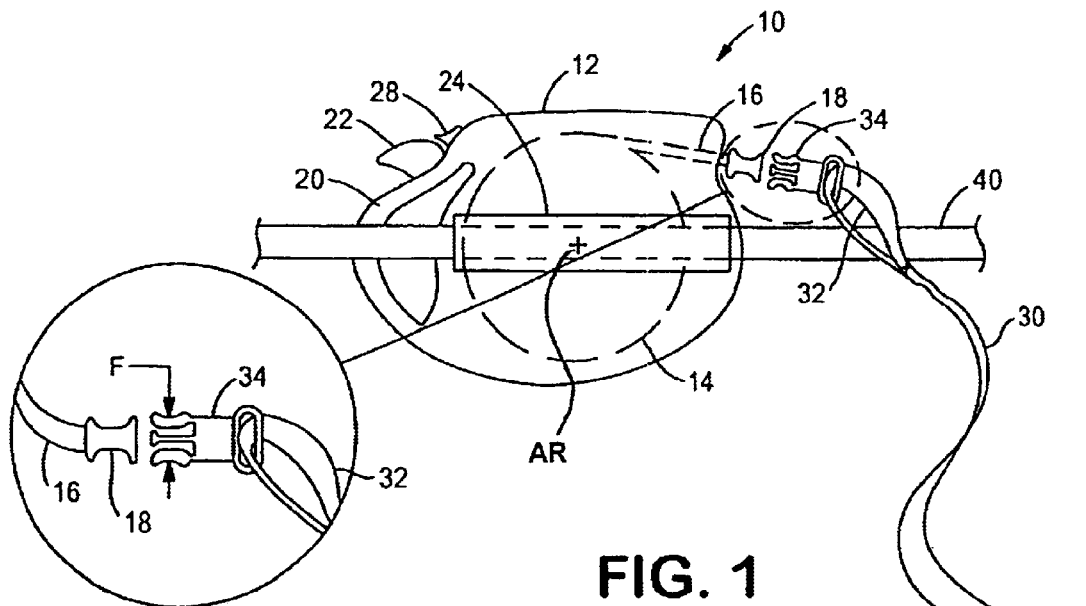
FIG. 1 is a front view of an exemplary pet leash consistent with the present invention.

FIG. 1 shows a retractable pet leash 10 comprising an enclosure 12 with a handle 20. The handle 20 being displaced radially from an axis of rotation AR of a retractor 14. The retractor 14, preferably a wind-up spool retractor, is disposed inside the enclosure 12 and is rotatable about the axis of rotation AR. The retractor 14 may include a spring that is biased to retract a first leash portion 16 towards the enclosure. The retractor 14 may be coupled to a first end (not shown) of the first leash portion 16. A first mating connector 18 maybe coupled to a distal end of the first leash portion 16. An opening in the enclosure may be sized to allow the first leash portion to slide in and out but not allow the connector 18 to be pulled through. A manually actuated brake 22, disposed in close proximity to the handle 20, may be actuated by a user to prevent the leash from moving relative to the enclosure 12. A brake lock 28 allows the user to prevent movement of the leash portion 16 without having to continuously apply pressure to the brake 22. The enclosure 12 may include a loop 24 or series of loops disposed to one side of the retractor 14. The loop 24 may be sized to allow a belt 40 to be inserted therein. The loop 24 coupled to the enclosure 12 to hold a belt 40 generally perpendicular to the axis of rotation AR of the retractor 14. The loop 24 allows a user to couple the retractable pet leash 10 about a user's waistline. In an alternative embodiment, the retractable pet leash 10 can be removed from the belt without having to unthread the belt 40. The leash portion may be made from a flexible material such as nylon. The retractable pet leash may also have a reflector or luminescent material to help the user be more visible in a darkened environment.

The first mating connector 18 may be used to couple the first leash portion 16 to a second leash portion 30. The second leash portion 30 may have a handle 32 disposed at a first end and a clasp 36 disposed at a second end. A second mating connector 34 may be coupled to the handle portion 32 of the second leash portion 30. The first and second mating connectors may be coupled and decoupled as desired. To decouple the first and second mating connectors, the user may apply a compressive force F. Alternative mating connectors would also work. The decoupeable second leash portion 30 allows the user to separate the second leash portion 30 from the retractable pet leash enclosure 12. The ability to separate the second leash portion 30 from the first leash portion 16 may allow the user to alternatively do long leash training with the retractable pet leash 10 secured about the user's waist and then do short leash training with the second leash portion secured in the user's hand.

Figure 2:
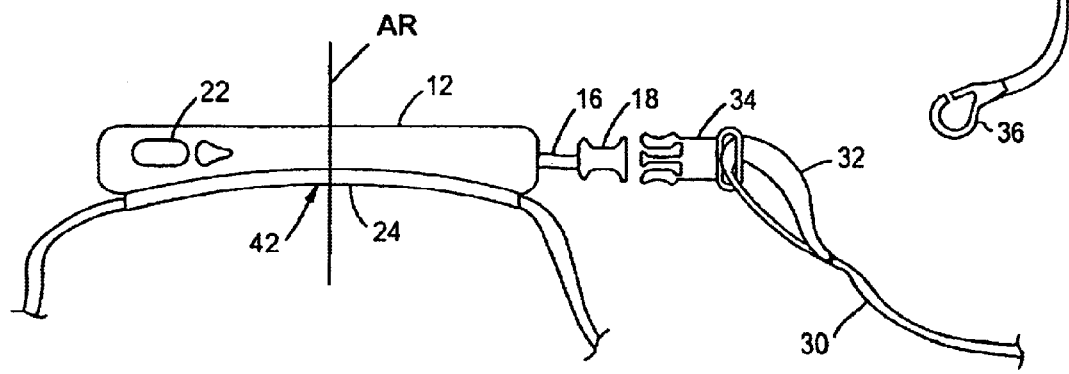
FIG. 2 is a top view of the pet leash of FIG. 1.

As shown in FIG. 2, an exterior surface 42 of the enclosure 12 may be concave. The concave exterior surface 42 may be contoured to cooperate with a user's waistline. The enclosure 12 may include a second concave exterior surface on the opposite side of the retractor 14 to allow the retractor to be worn on either the left or right side of the user. In an alternative embodiment, the housing may include a second opening to allow the first leash portion to extend thereout. This would also allow the retractable pet leash 10 to be worn on either side of the user.

Figure 3:
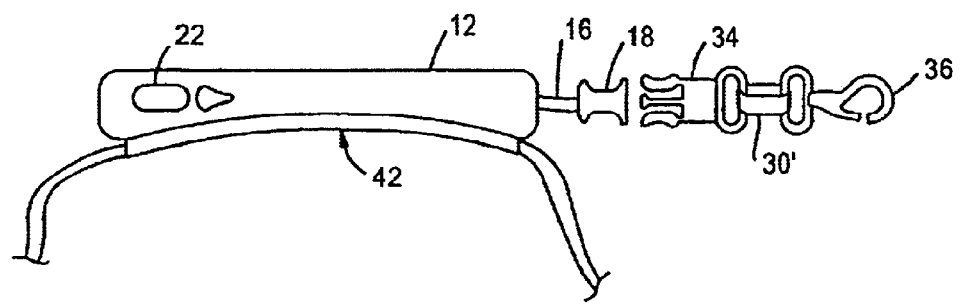
FIG. 3 is a top view of a second exemplary pet leash consistent with the present invention.

As shown in FIG. 3, the length of the second leash portion may be varied.

In an alternative embodiment, the first connector 18 maybe replaced with a clasp 36.

It should be understood that various features and options disclosed may be combined and are within the scope of the present invention. For example, the retractable leach of the present invention may be used as a child tether. The retractable leash could also be connected to a pet's harness.

It should be understood that, while the present invention has been described in detail herein, the invention can be embodied otherwise without departing from the principles thereof, and such other embodiments are meant to come within the scope of the present invention as defined in the following claim(s)

I claim:

1. A retractable leash, comprising:

a wind-up spool having an axis of rotation, the spool for holding a length of flexible leash;

an enclosure for housing the spool, the enclosure having a handle portion displaced radially from the axis of rotation of the spool, a concave exterior surface contoured to cooperate with a waist of a user, and a belt loop for maintaining the axis of rotation of the spool in a generally horizontal plane when the enclosure is worn about the waist of the user, a portion of the belt loop conforming to the concave exterior surface of the enclosure;

a spring for biasing the spool to retract the length of flexible leash into the enclosure; and a manually actuatable brake disposed in close proximity to the handle to prevent the leash from moving relative to the enclosure.

2. The retractable leash of claim (wherein the axis of rotation of the wind-up spool is disposed generally perpendicular to the concave exterior surface of the enclosure.

\* \* \* \* \*

UNITED STATES PATENT AND TRADEMARK OFFICE
CERTIFICATE OF CORRECTION

PATENT NO. : 6,688,260 B2
DATED : February 10, 2004
INVENTOR(S) : Morrison

It is certified that error appears in the above-identified patent and that said Letters Patent is hereby corrected as shown below:

<u>Column 4,</u>
Line 19, after "claim" insert -- 1 --
Line 19, delete "("

Signed and Sealed this

Eighteenth Day of May, 2004

JON W. DUDAS
*Acting Director of the United States Patent and Trademark Office*